No. 818,548. PATENTED APR. 24, 1906.
L. C. McNEAL.
TEMPORARY BINDER.
APPLICATION FILED MAR. 10, 1904.

2 SHEETS—SHEET 1.

Witnesses:
Clarence W. Carroll
L. Thow.

Inventor:
Luther C. McNeal
by Osgood & Davis
his Attys

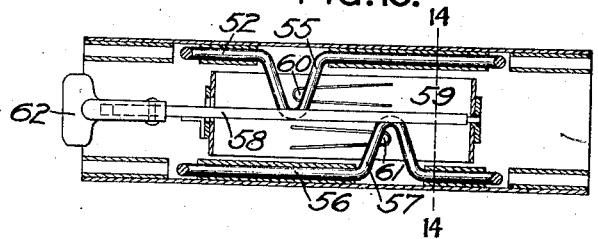
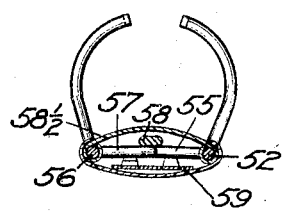
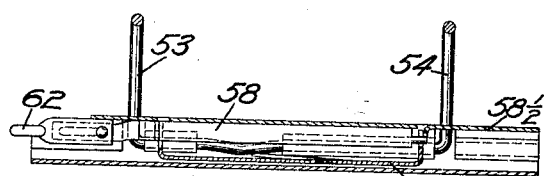
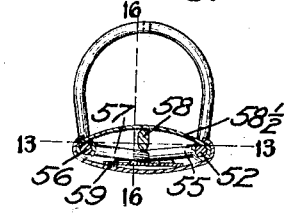
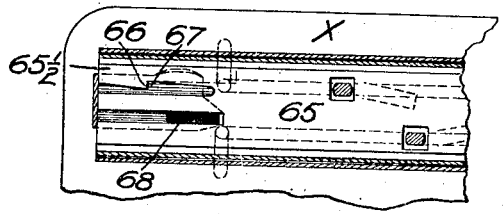
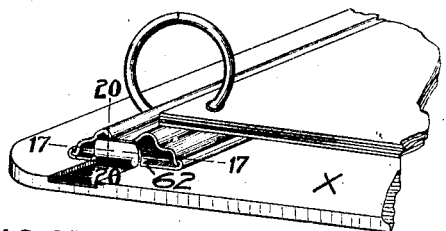
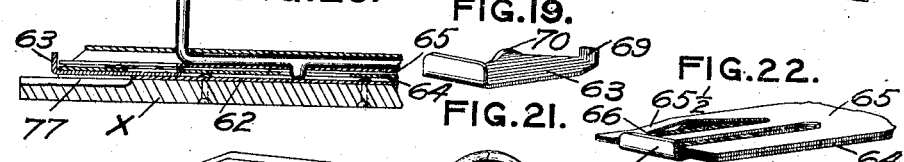
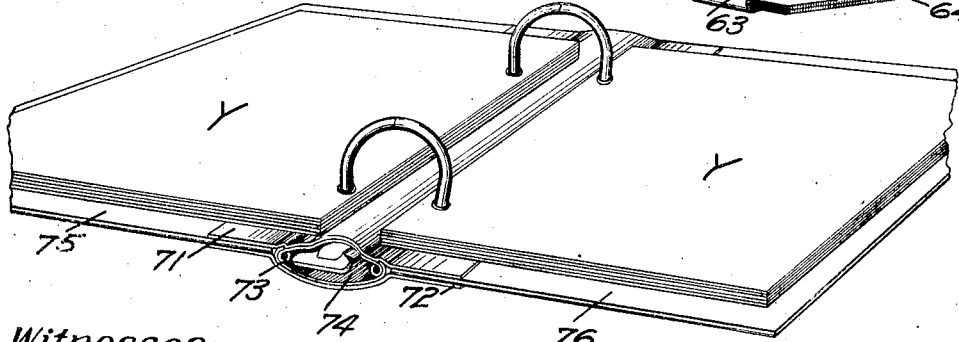

UNITED STATES PATENT OFFICE.

LUTHER C. McNEAL, OF ROCHESTER, NEW YORK, ASSIGNOR OF ONE-FOURTH TO HOWARD L. OSGOOD AND C. SCHUYLER DAVIS, OF ROCHESTER, NEW YORK.

TEMPORARY BINDER.

No. 818,543.      Specification of Letters Patent.     Patented April 24, 1906.

Application filed March 10, 1904. Serial No. 197,403.

*To all whom it may concern:*

Be it known that I, LUTHER C. McNEAL, a citizen of the United States, and a resident of Rochester, in the county of Monroe and State of New York, have invented certain new and useful Improvements in Temporary Binders, of which the following is a specification.

This invention relates to temporary binders for loose sheets, and has for its object to produce a binder that is simple and strong in construction and made of few parts that are readily assembled and operated.

Figure 1:
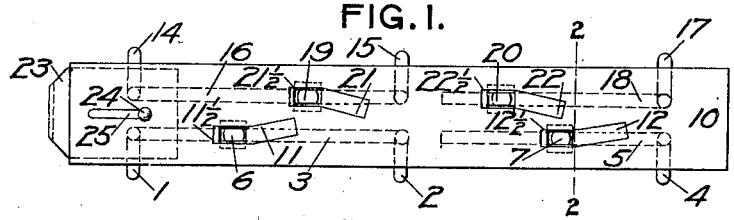
Figure 2:
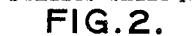
Figure 3:
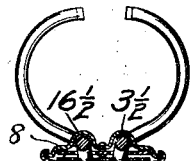
Figure 4:
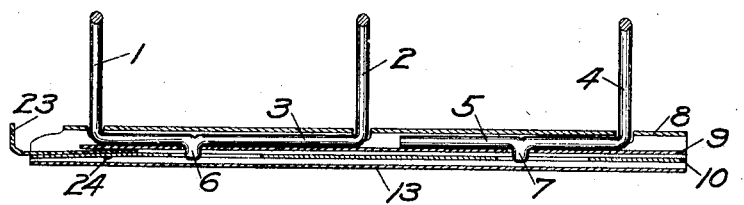
Figure 5:
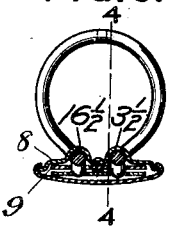
Figure 5:
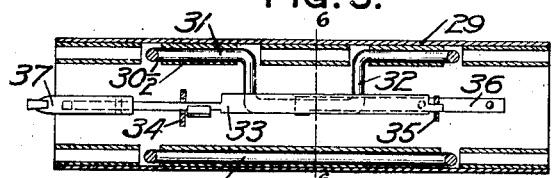
Figure 6:
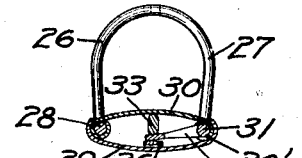
Figure 8:
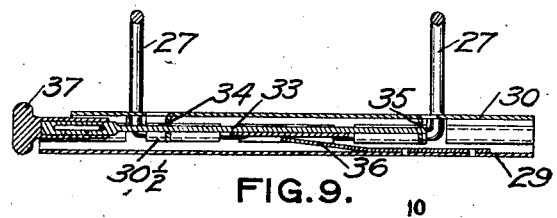
Figure 7:
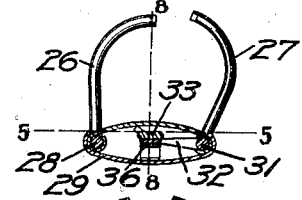
Figure 9:
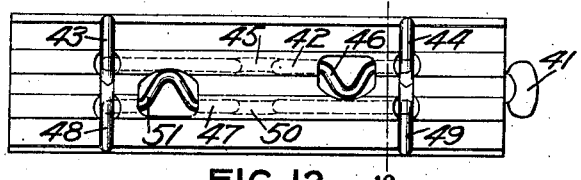
Figure 10:
Figure 12:
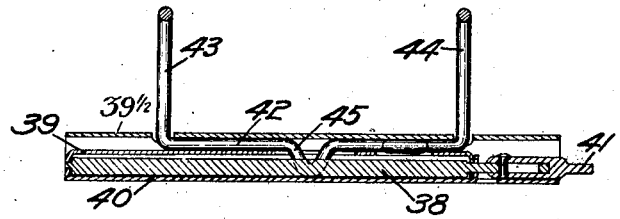
Figure 11:
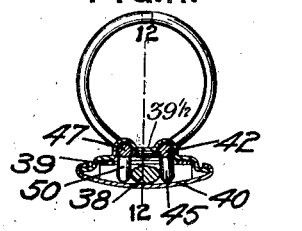

In the drawings, Figure 1 is a view of the binder from below when the binding-prongs are closed, the bottom and top plates being removed. Figs. 2 and 3 are cross-sections on the line 2 2 of Fig. 1, showing the prongs open and closed, respectively. Fig. 4 is a vertical section on the line 4 4 of Fig. 3. Fig. 5 is a horizontal section on the line 5 5 of Fig. 7 and shows a modified form of binder. Figs. 6 and 7 are cross-sections on the line 6 6 of Fig. 5, showing the prongs open and closed, respectively. Fig. 8 is a vertical section on the line 8 8 of Fig. 7. Fig. 9 is a top plan view and shows another modified form of binder. Figs. 10 and 11 are cross-sections on the line 10 10 of Fig. 9 looking toward the left and showing the prongs open and closed, respectively. Fig. 12 is a longitudinal section on the line 12 12 of Fig. 11. Fig. 13 is a horizontal section on the line 13 13 of Fig. 15 and shows still another modified form of binder. Figs. 14 and 15 are cross-sections on the line 14 14 of Fig. 13 looking toward the left and showing the prongs open and closed, respectively. Fig. 16 is a vertical section on the line 16 16 of Fig. 15. Fig. 17 is a horizontal section on the line 17 17 of Fig. 18. Fig. 18 shows the binder adapted to a filing-board. Figs. 19 and 22 show a key used in one form of the binder. Fig. 20 is a vertical section on the line 20 20 of Fig. 18, and Fig. 21 shows one style of binder in book form.

The binder, broadly speaking, comprises one or more pairs of oppositely-placed prongs, whose upper ends meet for retaining the papers, a support for the prongs, and means for opening and closing them. The binders are usually constructed with two pairs of prongs; but when they are to be used for large papers three pairs, or even more, may be desirable. The drawings show the construction with reference to both two pairs and three pairs of prongs.

The invention herein set forth resides in the means whereby the prongs are supported and operated.

In the construction shown in Figs. 1 to 4, inclusive, the prongs 1 and 2 on one side of the binder are attached to the rock-shaft 3 at their lower ends, and the third prong 4 on the same side is attached to another rock-shaft 5. The shaft 3 is rocked by an arm 6, thereby throwing the prongs 1 and 2 in and out of engagement with the prongs with which they mate, respectively, and a similar arm 7 on the shaft 5 fulfils a similar function with reference to the prong 4.

The rock-shafts 3 and 5 lie between the plates 8 and 9, which form an inclosing case that is oval in cross-section. The plate 9 has perforations through which the arms 6 and 7 extend and rotatively support the shafts 3 and 5 in position within the hollow rib $3\frac{1}{2}$ of the plate 8, which is bent part way around said shafts, respectively. The prongs are operated by means of the plate 10, which is movable transversely with reference to the plane of the movement of the prongs and which has inwardly-directed diagonal slots 11 and 12, adapted to receive the arms 6 and 7, respectively. The outer ends $11\frac{1}{2}$ and $12\frac{1}{2}$ of the slots 11 12, respectively, are extended in the direction of the movement of the plate 10. The operating-plate 10 is retained in place by the bottom plate 13, which in turn is locked to the outer edges of the top plate 8, as shown in Figs. 2 and 3.

The prongs 14 and 15, which are opposite, respectively, to the prongs 1 and 2, are attached to a rock-shaft, like the shaft 3. This shaft is shown in dotted lines as 16 in Fig. 1. The prong 17, which is opposite the prong 4, is attached to another rock-shaft, like the shaft 5. This last-mentioned shaft is shown in dotted lines as 18 in Fig. 1. The shafts 16 and 18 are also rotatively supported upon the plate 9 within the rib $16\frac{1}{2}$ of said plate 8, and said shafts have projections or arms 19 and 20, respectively, which pass through the plate 9 and lie, respectively, in inwardly-directed diagonal slots 21 and 22 in the operating-plate 10. The outer walls 21½ and 22½ of these slots, respectively, are also extended in the direction of the movement of the operating-plate 10. When, therefore, the operating-plate 10 is drawn outwardly, the cranks 6, 7, 19, and 20 are caused to turn inwardly by reason of their connection with said plate through the diagonal slots, thereby rocking the prongs of each pair back from each other, and so opening the binder. The holes in the plate 9 are wide enough to permit the cranks 6, 7, 19, and 20 to turn within them, respectively. When the arms of the shafts lie, respectively, in the straight extensions 11½, 12½, 21½, and 22½ of the slots, the prongs are closed and so locked that they can only be opened by moving the operating-plate till the arms lie in the diagonal parts of the slots.

An extension-plate 23 may be attached to the operating-plate 10 by suitable means, as by a pin 24 on one of the parts that enters a slot 25 in the other.

Figs. 5 to 8, inclusive, show two pairs of mating prongs and represent those on one of the sides of the binder as stationary, so that the binder is opened by tilting back the prongs on one side only. In Figs. 6 and 7 the prong 26 is stationary and the prong 27 adapted to swing. The stationary prongs and the swinging prongs, respectively, are both represented in all the figures of the drawings as formed in one piece with the horizontal shaft. In Figs. 5 to 8, inclusive, the shaft 28, from which the stationary prongs rise, is secured in place between the plates 29 and 30 of the binder by soldering or in any other suitable manner. The shaft 31 of the swinging prongs is rotatively supported between said plates, which form a casing that is oval in cross-section, and within a portion 30½ of the plate 30, bent around said shaft. Said shaft has upon it an arm 32, by which it is rocked and which in Fig. 5 is shown in the form of a bend in the shaft.

In the construction shown in Figs. 5 to 8, inclusive, the rocking arm 31, that carries the swinging prongs, is operated by a bar 33. Fig. 8 shows the bar 33 rotatively supported in downwardly-projecting ears 34 and 35 on the upper plate 30. The bar 33 lies above the arm 32 on the rocking shaft 31 and is thicker through in one dimension than the other, so that when it lies in the position shown in Fig. 6, in which the greater thickness is in the vertical plane, it bears down upon the arm 32 till it forces the swinging prongs into engagement, respectively, with the opposite stationary prongs; but when the bar 33 is turned over into the position shown in Fig. 7, in which its thinner dimension lies in the vertical plane, the swinging prongs are free to swing away from the stationary prongs, and so to open the binder. A spring 36 tends normally to keep the arm 32 of the rock-shaft in contact with the operating-bar 33. Said bar is operated by the hand-piece 37, which is extensible for that purpose, like the operating-plate described in connection with the figures first described.

The construction shown in Figs. 9 to 12, inclusive, differs from that last described in that in this construction the prongs on both sides of the binder are adapted to swing and that the prongs are both opened and closed by the positive action of the operating-rod. In this construction the rocking shafts 42 and 47 are supported within the casing formed by the top plate 39½ and the intermediate plate 39 in the same way as in the form first described, and a bottom plate 40 incloses the operating-rod 38. The operating-rod 38 is represented as rotatively supported in ears on the plates 39 and 40, and a hand-piece 41 is shown for turning it. The operating-bar is thicker in one dimension than the other. The rocking shaft 42, carrying the tilting prongs 43 and 44, has two arms. When the prongs are closed, as shown in Fig. 11, one, 45, of these arms is vertical, and the other, 46, is horizontal. The other rock-shaft 47, carrying the prongs 48 and 49, also has two arms, one, 50, of which is vertical and the other, 51, is horizontal when the prongs are closed. The operating-bar 38 lies below the horizontal arms 46 and 51 and between the vertical arms 45 and 50. The dimensions of the operating-rod are such that when it lies in one position it raises the horizontal arms 46 and 51 and releases the vertical arms 45 and 50, thereby opening the binder, as shown in Fig. 10, and when it is turned over it forces out the vertical arms 45 and 50 and releases the horizontal arms 46 and 51, thereby closing the binder, as shown in Fig. 11.

Figs. 13 to 16, inclusive, show a construction that differs from that of Figs. 5 to 8, inclusive, in that in this construction the prongs in both sides of the binder are adapted to tilt and that a spring of another form is employed. In this construction the shaft 52, carrying the tilting prongs 53 and 54, has an inwardly-extending arm 55, by which it is rocked. The other shaft 56 has a similarly inwardly extending arm 57, by which it is rocked. An operating-bar 58 is rotatively supported above the arms 55 and 57 in ears on the plates 58½ and 59. Springs 60 and 61 tend to force the arms up, and thereby to tilt the prongs open, as shown in Fig. 14. The springs are tongues on the plate 59. The operating-bar 58 is thicker in one dimension than the other and when turned into one position releases the arms 55 and 57, so that the springs 60 and 61 can raise them, and thereby tilt the prongs open (see Fig. 14) and when turned into the other direction forces down the arms 55 and 57, and thereby closes the prongs. (See Fig. 15.) The rod 58 is operated by the hand-piece 62. While a spring is shown in some of the forms represented in the drawings for the purpose of automatically opening the tilting prongs, the springs may be omitted, for the weight of the papers will tend to open the binder, and in any event as soon as the prongs are released by the operating-bar they can be readily opened manually.

In Figs. 17 to 20, inclusive, a binder of the type first described above is represented as attached to a flat filing-board X, and some modifications are also represented. When the binder is to be used upon a board, its lower plate 62 is preferably made flat and is fastened to the board in some suitable manner. In the figures last mentioned a removable key 63 (see Fig. 19) is substituted for the extension-piece 23 of the operating-plate 10, (see Figs. 1 to 4, inclusive,) and the operating-plate 64 is adapted to engage a part of the fixed plate 65, so that said operating-plate cannot be withdrawn to tilt the prongs except by the key 63. The construction that is represented in these figures for accomplishing these results is as follows: The plate 65 has a spring-tongue 65½, within whose side a notch 66 is cut. The operating-plate 64 has a corresponding notch 67 on its side so placed that the shoulders formed by the notches engage each other and prevent the operating-plate 64 from being withdrawn when it is in the position in which the binder is closed. The operating-plate 64 has also a longitudinal slot 68 near its end. The key 63, which is shown in Fig. 19, has a finger 69, that enters the slot 68 and engages the operating-plate 64 to withdraw it from the casing, and also has a shoulder 70, that slides beneath the spring-finger 65½ when the key is inserted beneath the operating-plate and raises the finger till it is disengaged from the operating-plate. The key 63 is both detachable from the operating-plate and removable from the binder, so that the prongs can be locked closed. In order that the key may be inserted in the binder to engage the operating-plate when the latter is pushed inwardly to close the prongs, the board is represented as recessed at 77 to a depth sufficient to allow the finger 69 on the key 63 to be inserted beneath the operating-plate 64 and pushed back to the slot 68 in said operating-plate. It is obvious that these parts may be modified in various respects.

In Fig. 21 the binder is shown in book form. Flexible strips 71 and 72 are fastened upon the casing formed by the plates 73 and 74, within which the operating parts are contained, and covers 75 and 76 are secured between said strips 71 and 72. When the book is opened out, as shown in Fig. 21, the sheets can lie upon either cover.

In all the forms shown the prongs extend through the top plate of the casing, which accordingly acts as a brace to keep them alined. By making the casing oval the operating parts are inclosed within small compass, and at the same time the sheets can be readily turned upon the prongs.

What I claim is—

1. In a binder the combination of two connected plates forming an inclosing case for the operating mechanism; a rock-shaft rotatively secured between said plates, carrying one or more tilting prongs, and an arm for rocking it; mating prongs supported oppositely to said tilting prongs, respectively; an actuator between said plates, adjacent to said rocking arm, and adapted when moved in one direction to engage said arm and thereby to tilt said prongs; and an extensible hand-piece, whereby said actuator is operated.

2. In a binder, the combination of a support; a rock-shaft rotative thereon, carrying one or more tilting prongs; mating prongs supported oppositely to said tilting prongs, respectively; an actuating-plate adapted to slide longitudinally of the rock-shaft and thereby to tilt said tilting prongs; means for locking said actuating-plate to a part of said support when said prongs are in the closed position, and an extension-piece adapted to unlock said parts and to engage said actuating-plate for moving it to tilt the prongs.

3. In a binder, the combination of a support; a rock-shaft rotative thereon, carrying one or more tilting prongs; mating prongs supported oppositely to said tilting prongs, respectively; an actuating-plate adapted to slide longitudinally and thereby to tilt said tilting prongs; means for locking said actuating-plate to a part of said support, when the prongs are in the closed position, and a movable extension-piece adapted to engage said actuating-plate for moving it to tilt the prongs.

4. In a binder of book form, the combination of a casing forming the back of the book; one or more pairs of tilting prongs for holding loose sheets; means contained within said casing for supporting and opening and closing said prongs; covers for said binder; and flexible strips secured upon the top and bottom of said casing, respectively, and between which the covers are secured; substantially as shown and described.

5. In a binder, the combination of a rock-shaft carrying one or more tilting prongs and an arm for rocking it; two connected plates forming an inclosing case for parts of the operating mechanism, the uppermost of said plates having slots through which the prongs pass that are secured to the rock-shaft; means for rotatively securing said rock-shaft within said case upon the surface of one of said plates, between the ends of said rock-shaft; mating prongs supported upon said case opposite to said tilting prongs, respectively, and hand-operated means adapted to engage said arm and thereby to open and close said prongs.

6. In a loose-leaf binder, the combination with a casing comprising a base having laterally overlapping flanges on its longitudinal edges, and a plate or strip having its edges confined to the base by the said flanges, of a slide mounted within said casing provided with cams, and binding-post members pivotally supported on the casing and having projecting lugs for coöperating with said cams when the slide is moved to close and lock the binding-post members.

7. In a loose-leaf binder, the combination with a base having laterally-overlapping flanges on its longitudinal edges, a plate or strip having its longitudinal edges confined by said overlapping edges and coöperating with the base to form a housing, rock-shafts longitudinally arranged within the housing and having arcuate leaf-engaging spurs at right angles to the shafts and projecting through openings in said housing, a slide within the housing, and means on the rock-shafts for engagement with the slide.

LUTHER C. McNEAL.

Witnesses:
D. GURNEE,
L. THON.